(12) United States Patent
Vanagosoom (10) Patent No.: US 8,579,330 B2
(45) Date of Patent: Nov. 12, 2013

(54) FLUID RECEIVER

(75) Inventor: Ekapote Vanagosoom, Bangkok (TH)

(73) Assignees: Colin Gilbert Tobeck, Christchurch (NL), As trustees of the Progressive Endeavours Trust; Rosalie Bernadette Tobeck, Christchurch (NL), As trustees of the Progressive Endeavours Trust ( * ) Notice: Subject to any disclaimer, the term of this patent is extended or adjusted under 35 U.S.C. 154(b) by 121 days.

(21) Appl. No.: 13/127,702

(22) PCT Filed: Nov. 5, 2009

(86) PCT No.: PCT/NZ2009/000237
§ 371 (c)(1),
(2), (4) Date: May 18, 2011

(87) PCT Pub. No.: WO2010/053380
PCT Pub. Date: May 14, 2010

(65) Prior Publication Data
US 2011/0226779 A1    Sep. 22, 2011

(30) Foreign Application Priority Data
Nov. 5, 2008   (NZ) ........................................ 572545

(51) Int. Cl.
*B65D 88/12*        (2006.01)

(52) U.S. Cl.
USPC .......................................... 280/830; 220/562

(58) Field of Classification Search
USPC ........... 220/562, 563, 564; 280/830, 831, 836
See application file for complete search history.

(56) References Cited

U.S. PATENT DOCUMENTS

| 2,022,324 | A |   | 11/1935 | Schock |   |
|---|---|---|---|---|---|
| 2,056,820 | A |   | 10/1936 | Bradley et al. |   |
| 2,239,442 | A |   | 4/1941 | Gredell |   |
| 2,860,809 | A |   | 11/1958 | Perry |   |
| 3,310,070 | A |   | 3/1967 | Black |   |
| 4,960,222 | A |   | 10/1990 | Fields, III |   |
| 5,186,352 | A | * | 2/1993 | Otto et al. | 220/564 |
| 5,782,493 | A | * | 7/1998 | Bolton et al. | 280/837 |
| 2007/0184223 | A1 | * | 8/2007 | Thomasset | 428/35.7 |

FOREIGN PATENT DOCUMENTS

| EP | 520575 | 6/1991 |
|---|---|---|
| GB | 461294 | 2/1937 |
| GB | 461924 | 2/1937 |

OTHER PUBLICATIONS

Examination Report issued in United Kingdom Patent Application No. GB1107460.6 on Aug. 7, 2012.
International Search Report issued in International Patent Application No. PCT/NZ2009/000237 (2010).
Written Opinion issued in International Patent Application No. PCT/NZ2009/000237 (2010).

* cited by examiner

*Primary Examiner* — Tony Winner
*Assistant Examiner* — Jacob Knutson
(74) *Attorney, Agent, or Firm* — Barnes & Thornburg LLP (57) ABSTRACT

The invention relates to a fluid receiver for attaching to a vehicle. The fluid receiver comprises a receiver body having side walls extending upwardly from a receiver floor. A wheel arch is formed within the receiver floor and comprises a reinforced mounting plate to which is attached a mounting system for attaching wheels to the fluid receiver. The receiver is, therefore, adapted to be attached directly to a wheel mounting system and suspension system without needing to be mounted to a chassis or sub-frame. As such, the receiver has a lower center of gravity and higher static rollover threshold, resulting in increased stability, particularly when the receiver is attached to a vehicle negotiating rough terrain or slopes.

14 Claims, 9 Drawing Sheets

FLUID RECEIVER

CROSS-REFERENCE TO RELATED APPLICATIONS

This application is a U.S. nationalization under 35 U.S.C. §371 of International Application No. PCT/NZ2009/000237, filed on Nov. 5, 2009, which claims priority from New Zealand Patent Application No. 572545, filed on Nov. 5, 2008, and incorporates by reference the disclosures of such applications.

FIELD OF THE INVENTION

This invention relates to a transportable fluid receiver that is integral with the load bearing structure of a vehicle (prime mover) or carrier for towing behind a vehicle.

BACKGROUND OF THE INVENTION

Fluid receivers confine and store fluid and can be used to transport fluid.

Fluid receivers that confine, store, and act as a means for fluid transportation are traditionally constructed using a "tank type" vessel mounted on a chassis or sub-frame. This is particularly the case when the receiver has its own set of drive axle(s) and wheels and is towed behind a vehicle/prime mover.

Traditional problems associated with the transportation of fluid relate to poor stability of the fluid receivers as they travel over uneven surfaces, traverse sloped planes, or confront an incline or decline. These problems arise due to a high centre of gravity resulting from the use of a chassis or sub-frame. Traditionally, the entire fluid receiver is mounted above an independent chassis or sub-frame that is located above the axles, suspension, and drive components of the prime mover or carrier. As a result, the fluid receiver is elevated, increasing the overall vehicle height and elevating the load, and therefore, the centre of gravity.

Another problem with known fluid receivers is the freely moving fluid within fluid receivers whilst in transit, causing the load to become unstable. As the fluid receiver changes direction, gradient, tilt, or speed, the fluid mass maintains its original forces, resulting in movement of the fluid mass within the receiver, which causes the load to become unstable whilst the mass corrects itself to the new forces generated by changes in movement of the fluid receiver. The reduced stability resulting from the contained fluid mass moving during transit is compounded by the elevated centre of gravity because of the use of a chassis or sub-frame, making the vehicle more susceptible to rolling over.

Therefore, the transportation of fluid is often a dangerous and difficult job, especially in "off-road" applications where the uneven road surface creates almost constant movement of the fluid mass at an elevated centre of gravity within the receiver, resulting in a low static rollover threshold and a highly unstable load.

The role of the chassis or sub-frame in conventional fluid receivers is particularly vital in maintaining industries' desired vehicle payloads to ensure that the volume of fluid transportation remains efficient. Heavy materials are used to construct chassis' and sub-frames in order for the prime mover or towed carrier to support heavy payloads generated by fluid receivers and the contained fluid mass. As a result, another problem with known fluid receivers is that the payload capacity of the prime mover, or towed carrier, is reduced.

It is an object of the invention to: (a) provide a fluid containing apparatus that goes at least some way towards overcoming the lack of stability suffered by known fluid receivers when in transit, by lowering the centre of gravity of the fluid receiver; or (b) at least provide the public with a useful choice.

SUMMARY OF THE INVENTION

The invention provides a fluid receiver in which the strength traditionally provided by a load bearing chassis is encompassed into the design of the receiver itself. Thus, the fluid receiver of the invention can be towed behind a vehicle without first being mounted to a chassis or sub-frame. Typical features of a chassis, such as axle mounts and suspension are able to be attached to the fluid receiver of the invention to form an integral receiver-chassis system. This allows the fluid receiver to be lower to the ground, resulting in the overall height of the fluid receiver to be lower with respect to the ground and resulting in a lower centre of gravity. The lower centre of gravity increases the static rollover threshold of a vehicle carrying or towing the receiver, thereby increasing stability and providing for the safer transportation and confinement of fluid, especially over uneven terrain or when turning corners.

In one aspect, the invention provides a fluid receiver for attaching to a vehicle, the fluid receiver comprising: a receiver body comprising side walls extending upwardly from a receiver floor; wherein a wheel arch is formed within the receiver floor and comprises a reinforced mounting plate to which is attached a mounting system for attaching wheels to the fluid receiver, the mounting system comprising at least one axle and axle mount.

The fluid receiver may be attached to a vehicle by mounting the receiver onto a truck or towing the receiver behind a vehicle.

Preferably, the receiver floor is shaped to define an inverted U-shaped drive shaft tunnel that extends between the wheel arch and a front end of the fluid receiver. The drive shaft tunnel may optionally be substantially surrounded by a brace.

The mounting system of the invention may further comprise a suspension system.

In a preferred form, the mounting system comprises first and second axles that engage with a suspension system comprising: a pair of walking beams attached to the receiver floor via a centrally located pivot shaft held within a pivot shaft housing attached to or integral with the mounting base; wherein at least one shock absorber is positioned at or near distal ends of each walking beam so as to be located between the walking beams and axles; and at least one locating means attached to the receiver body and the first axle; and at least one locating means attached to the receiver body and the second axle.

Preferably, each locating means comprises a bracket having splayed arms that attach to the respective axle.

Preferably, each shock absorber comprises a rubber block suspension unit.

In another preferred form, at least one vertical or horizontal baffle is positioned within the receiver body to define a plurality of compartments within the receiver.

At least one unidirectional valve may be positioned in the at least one horizontal baffle.

At least one bidirectional diffuser door may be positioned in the at least one vertical baffle.

Preferably, stress disbursement means are positioned between one or more joins formed between structural components of the receiver body.

In another preferred form, the receiver body further comprises an upper portion wherein a frame is located on the receiver body interior and is positioned to substantially surround the periphery of the upper portion of the receiver body; and wherein the side walls of the receiver body are attached to the frame. Preferably, a top section that is attached to the frame.

More preferably, the frame comprises a base and a pair of arms extending from each side of the base to form a substantially U-shaped section, the base of the frame being positioned to face toward the side walls of the receiver body.

This invention may also be said to broadly consist in the parts, elements, and features referred to or indicated herein, individually, or collectively, and any or all combinations of any two or more said parts, elements, or features. Where specific integers are mentioned herein that have known equivalents in the art to which the invention relates, such known equivalents are deemed to be incorporated herein as if individually set forth.

BRIEF DESCRIPTION OF THE DRAWINGS

The invention will now be described by way of example only and with reference to the accompanying drawings in which.

DETAILED DESCRIPTION OF THE PREFERRED EMBODIMENT

In one form, the fluid receiver of the invention comprises a receiver body 1 comprising a floor 2, side sections 3 and, optionally, a top section 4. In the embodiment shown in FIGS. 1 and 2, the receiver side sections 3 are welded to a top section 4 along a frame 5 that substantially surrounds the upper portion of the receiver. The frame 5 may comprise a base 6 and a pair of arms 7a, 7b that extend from each side of the base to form a substantially U-shaped section or channel. The base 6 of the frame, or bottom of the "U" shape, is positioned to face toward the side walls 3 of the receiver body.

Figure 1:
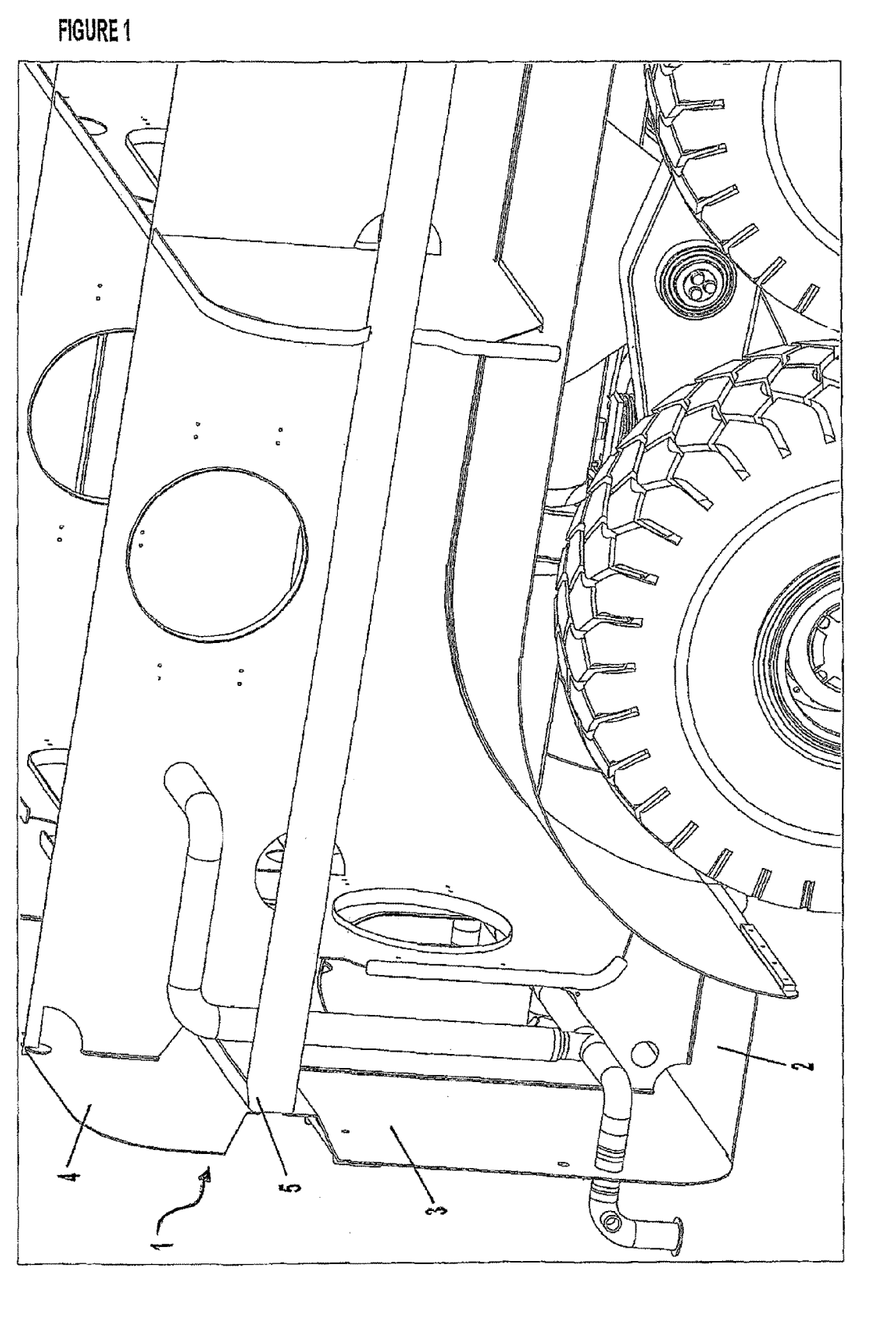
FIG. 1 is a partial cross-sectional view of the receiver body from one side showing the frame extending along the side and rear of the receiver body according to one embodiment of the invention.
Figure 2:
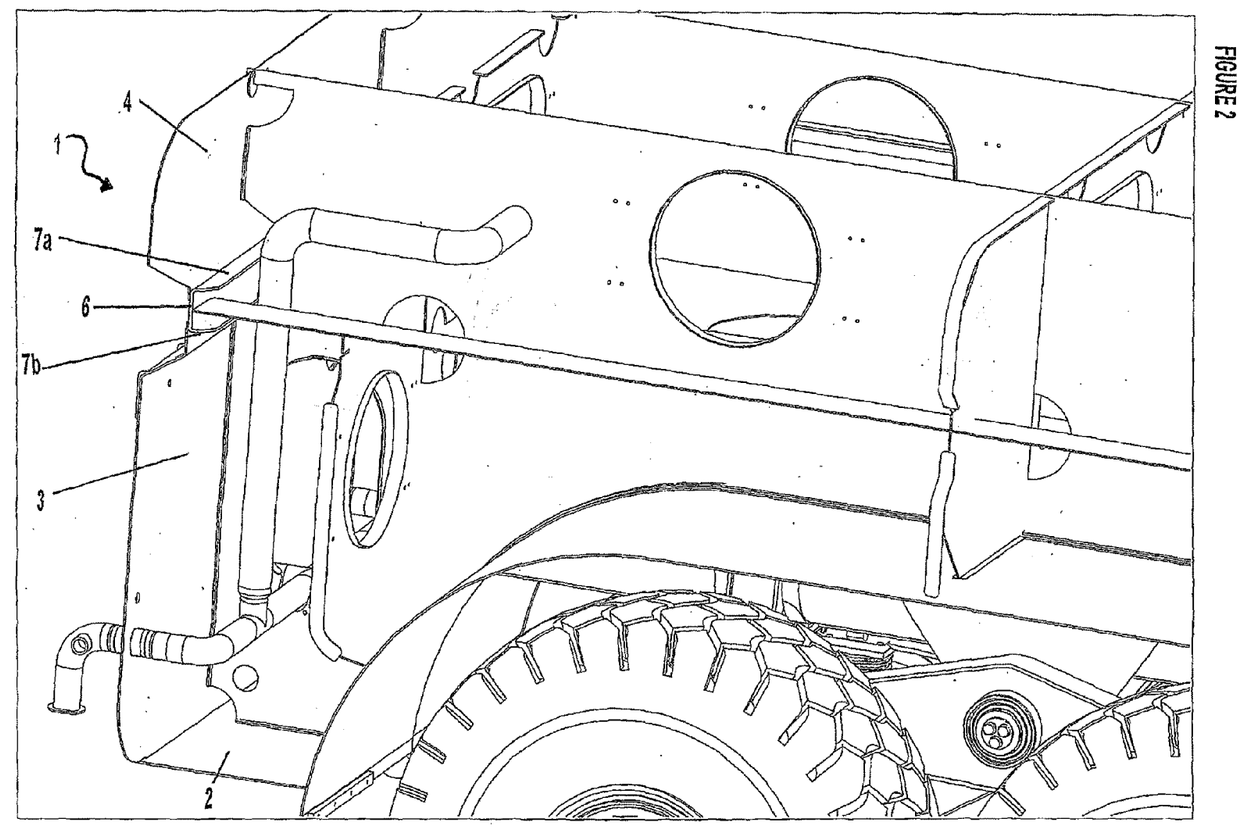
FIG. 2 is another partial cross-sectional view of the receiver body of FIG. 1, wherein the frame along the side wall has been removed to expose a horizontal baffle according to one embodiment of the invention.

The shape of the side sections 3 and top section 4 and the joint created by the weld between these sections and the frame 5 provide strength to the receiver and allow for lighter material (such as mild steel) to be used in the side sections and top section. The shape of each wall includes an angle sloped toward the frame 5. This shape of the angled side sections and top section is achieved through rolling, folding, and curving of steel, and serves to radiate stress over a larger surface area whereby the monocoque structure of the fluid receiver performs the role of a chassis or sub-frame whilst maintaining the primary objective of a providing a vessel. Thus, the applicant has discovered that the weight of the receiver, when empty, is reduced and the available payload can be increased using this unique construction.

The side sections or side walls 3 are connected to the receiver floor 2 at or near the bottom of the side sections so that the side walls extend upwardly from the receiver floor.

Figure 3:
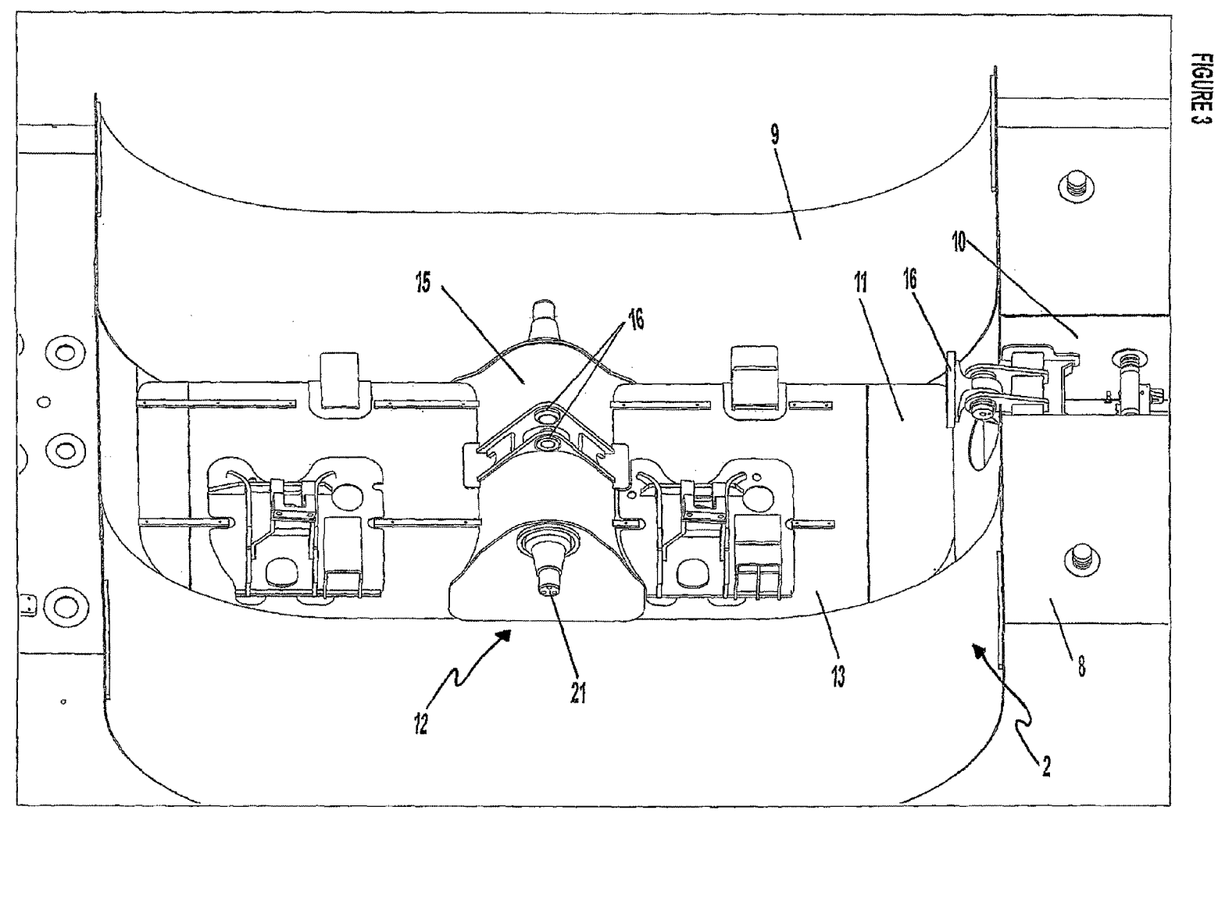
FIG. 3 is another underside view of a receiver according to one embodiment of the invention.
Figure 4:
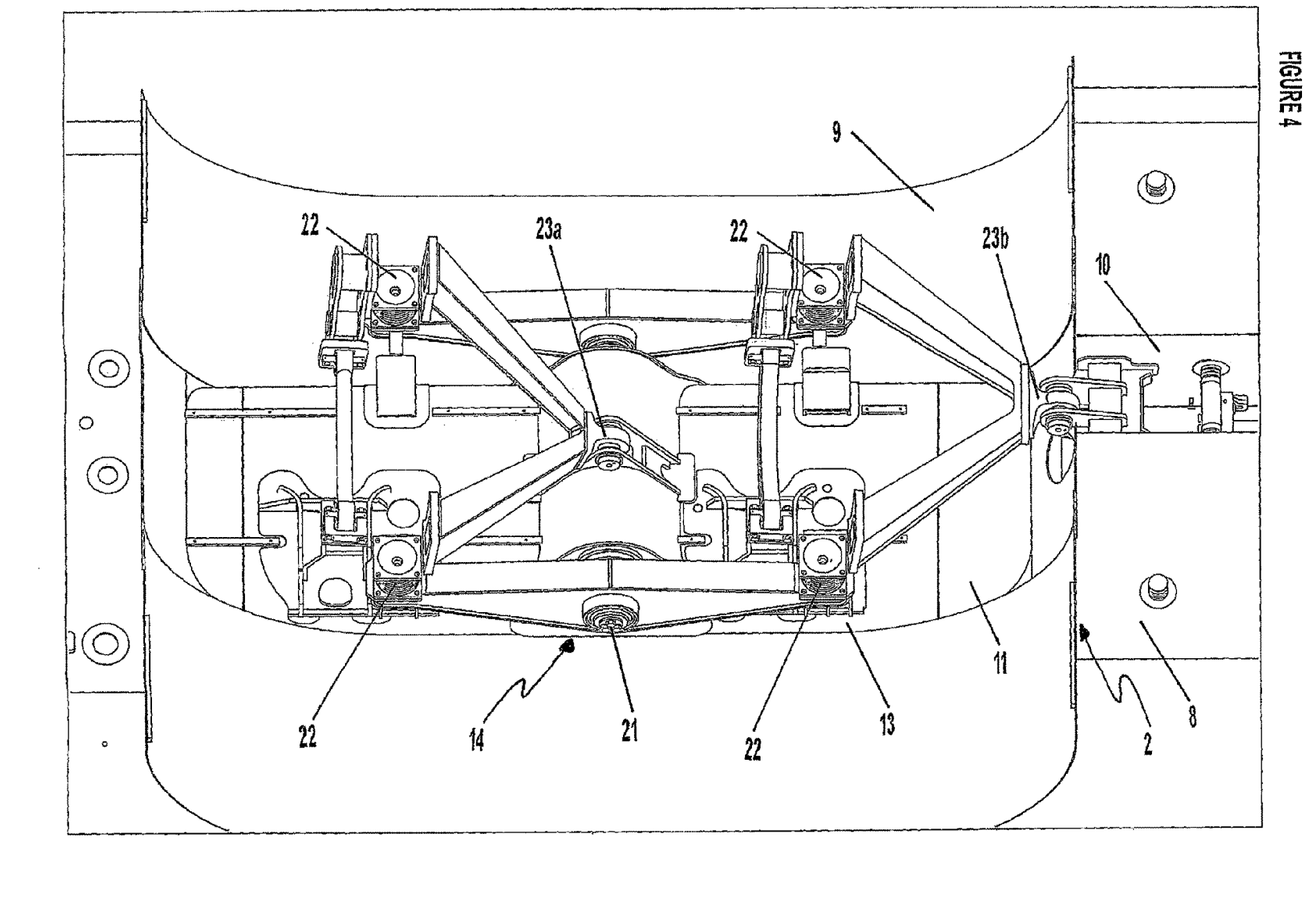
FIG. 4 is an underside view of the receiver of FIG. 3 with additional mounting system and suspension system components visible.
Figure 5:
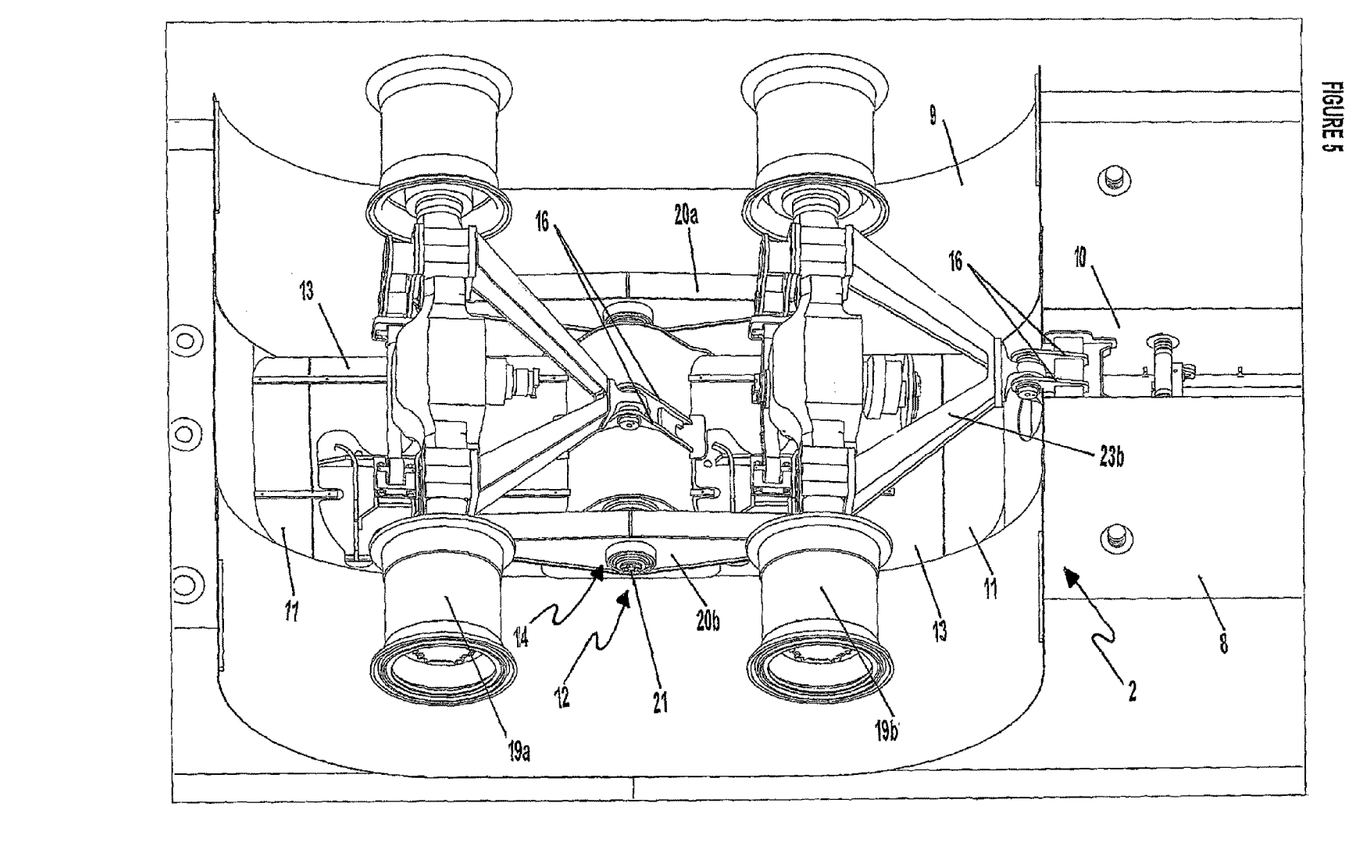
FIG. 5 is an underside view of the receiver of FIGS. 3 and 4 with axles visible.

The receiver floor has been specially modified to provide sufficient strength to the chassis-less receiver and mounting system. In particular, as shown in FIGS. 3 to 5, the receiver floor 2 comprises a substantially flat bottom surface 8, a portion of which comprises a wheel arch 9. An inverted U-shaped drive shaft tunnel 10 is formed in the bottom surface of the receiver floor 2 and extends between the wheel arch 9 and the front of the fluid receiver body.

The portion of the receiver floor comprising the wheel arch 9 includes a mounting base 11 to which the mounting system 12 is attached. The mounting base 11 comprises a reinforced base plate 13 for strength. In particular and according to one form of the invention as shown in FIG. 3, the mounting base projects from the receiver floor and at least a portion of the mounting base is reinforced using a twin skin, such as by folding the material from which the floor is made (such as steel) then welding on an additional, preferably folded, skin to create a twin layer of material. Typically, the twin skin forms a base plate 13 with a thickness of approximately 20 mm. However, it is envisaged that other ways of reinforcing the mounting base may also be used, as would be readily apparent to a person skilled in the art.

Thus, the receiver floor comprises a first inner skin and a second outer skin to create a reinforced mounting base with sufficient strength for mounting the mounting system 12 and suspension system 14 to the fluid receiver floor 2. In particular, the reinforced mounting base plate 13 has sufficient strength to allow the pivot shaft housing 15, axle mount(s) 16, and walking beams 20 to be securely mounted to the base 13.

Figure 6:
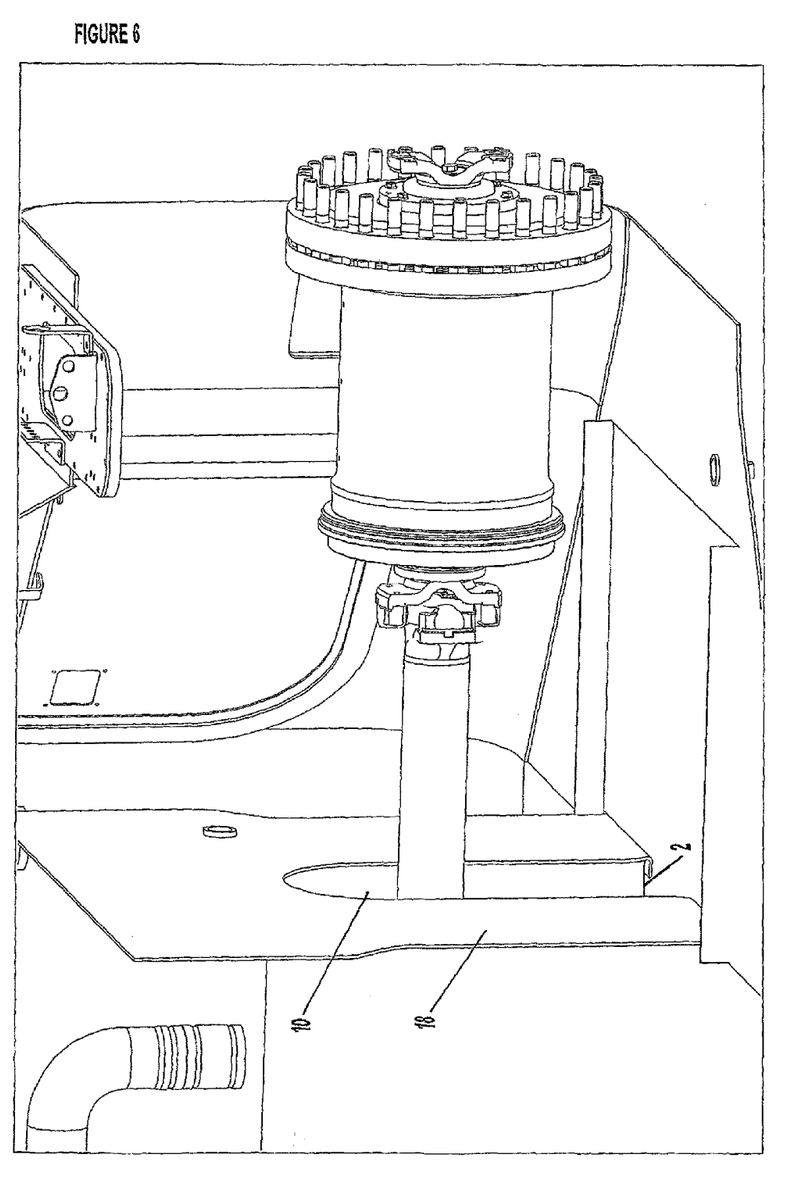
FIG. 6 is a partial cross-sectional perspective view showing the drive shaft, drive shaft tunnel, and bracing according to one embodiment of the invention.

The drive shaft tunnel 10, formed in the receiver floor, is substantially surrounded in part by a brace 18 in the bottom front of the receiver floor 2, as shown in FIG. 6. The drive shaft tunnel and bracing also add strength to the receiver floor to enable the pivot shaft housing, axle mount(s), and suspension mounts to be mounted directly to the receiver floor without the use of a chassis or sub-frame.

The design of the lower surface of the receiver body and the location of the suspension and axle mounts is an important feature of the invention.

The mounting system 12 attached to the receiver floor comprises at least one axle 19, at least one axle mount 16 for the at least one axle and, preferably, a suspension system 14. In the embodiment shown in FIGS. 3 to 5, the receiver mounting system 12 further comprises a tandem-axle walking beam suspension system 14. In particular, the mounting and suspension system comprises a pair of first and second axles 19a, 19b (in this case rear axles) that are connected via a pair of walking beams 20a, 20b and are attached to the receiver floor 2 via a centrally located pivot shaft 21 held within a pivot shaft housing 15. It is envisaged that single axle mounting systems may alternatively be used, as would readily be apparent to a person skilled in the art.

More specifically, the pivot shaft housing 15 is attached to, or integral with, the mounting base or base plate 13 of the receiver floor. The pivot shaft 21 is located within the pivot shaft housing and comprises first and second distal ends that are attached to a central point on the first and second walking beams 20a, 20b respectively. At least one shock absorber is attached to each walking beam. As shown in FIG. 4, each walking beam has first and second ends to which are attached shock absorbers in the form of rubber block suspension units 22, although it is envisaged that other types of suspension units could alternatively be used. In particular, a rubber block suspension unit 22 is positioned at or near each end of the walking beams 20a, 20b so that each rubber block suspension unit positioned at or near the first end of the walking beams contacts the first axle 19a and each rubber block suspension unit positioned at or near the second end of the walking beams contacts the second axle 19b.

Axle and suspension locating means 23a, 23b are attached to axle mounts 16 that are either directly or indirectly attached to the receiver body 1. In the embodiment shown in FIGS. 4 and 5, a first locating means 23a is attached to axle mounts 16a projecting from the pivot shaft for attaching to a first axle 19a. A second locating means 23b is attached to the floor of the receiver above the drive shaft for attaching to the second axle 19b. The locating means 23 are each in the form of a single bracket with splayed arms or beams that are attached to the axles 19 to locate and hold the axles in position and secure the suspension system 14 to the receiver body 1.

It is envisaged that the locating means may take on different forms. For example, each locating means may comprise a single arm so that more than one locating means may be required to attach an axle to the receiver body. Other forms of locating means could also be used, as would readily be apparent to a person skilled in the art.

The tandem-axle walking beam suspension system allows the wheels attached to the axles to work independently going up and down over rough or uneven terrain and lowers the height of the receiver with respect to the ground. The walking beam suspension system also increases the payload of the vehicle bearing or towing the receiver and improves its stability.

Although the mounting system has been described as including a tandem-axle walking beam suspension system, it is envisaged that the receiver could also operate using other suspension systems known in the art or without a suspension system at all.

Figure 7:
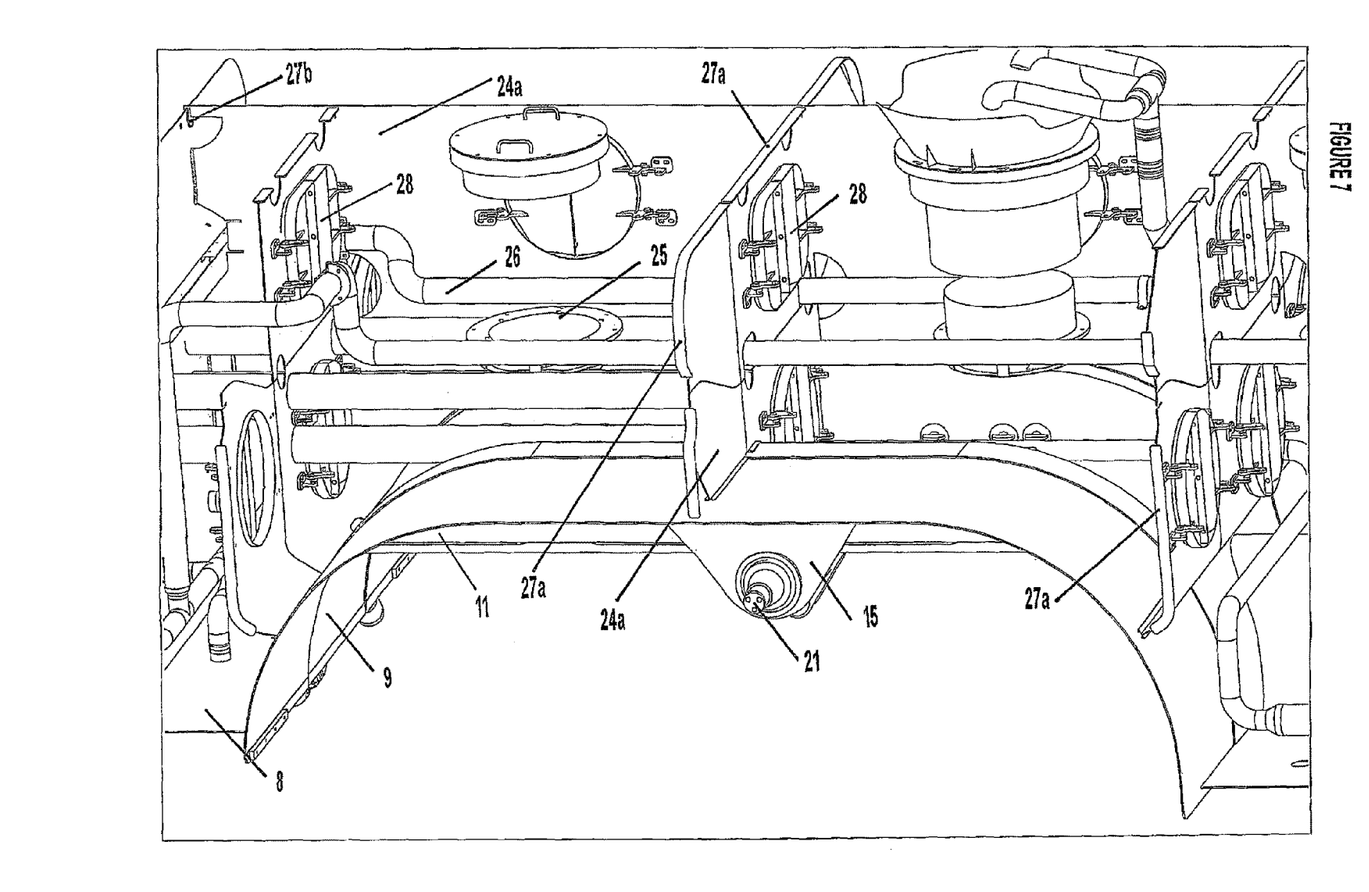
FIG. 7 is a partial cross-sectional view of the receiver body from one side and according to one embodiment of the invention.
Figure 8:
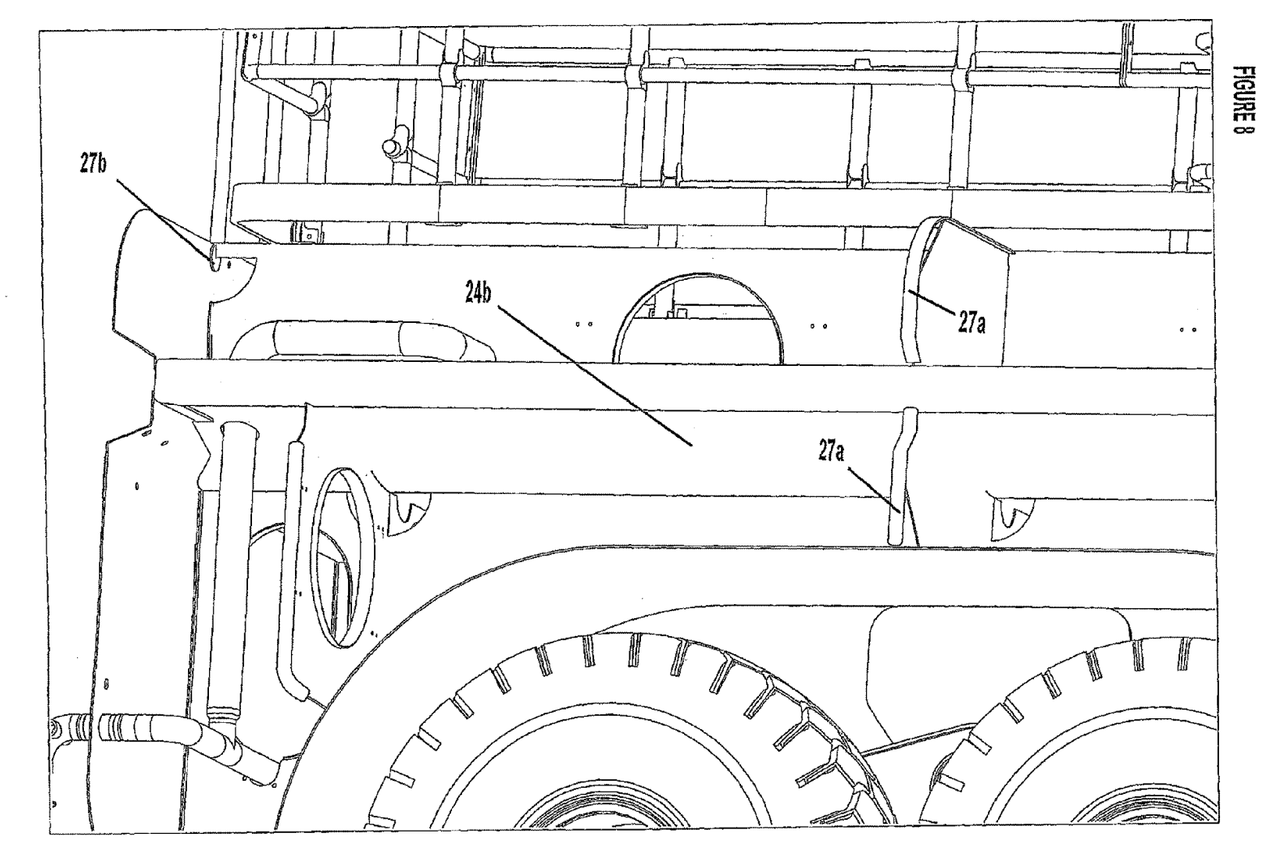
FIG. 8 is yet another partial cross-sectional view of the receiver body from one side and according to one embodiment of the invention.
Figure 9:
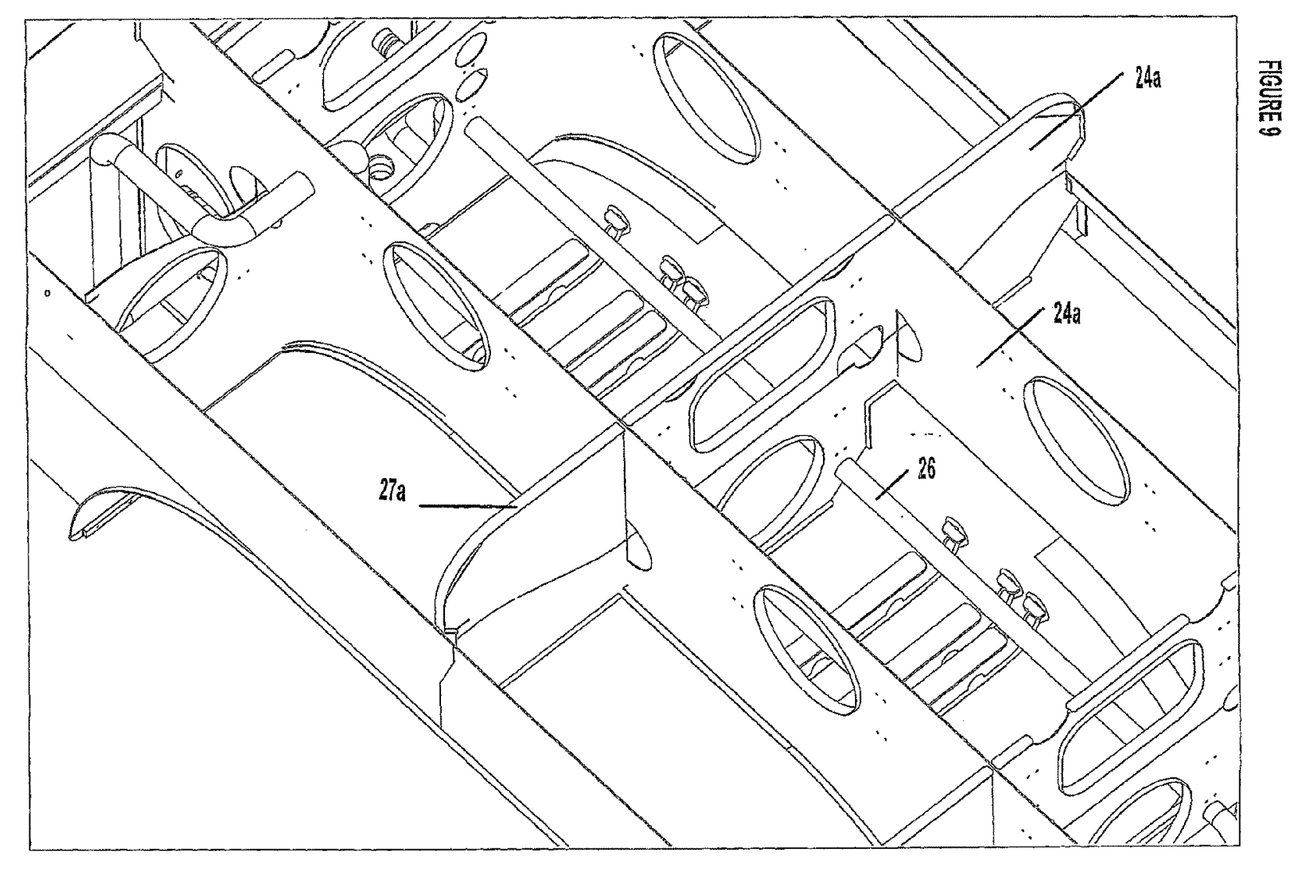
FIG. 9 is a partial cross-sectional view of the receiver body from above.

The internal construction of the receiver body can also be modified to improve the stability of the receiver. In particular, the interior of the receiver body 1 may optionally include one or more baffles 24 that separate the body into a plurality of compartments and add to the strength of the receiver. Within the at least one horizontal baffle 24b is located at least one unidirectional check valve 25 that restricts the movement of fluid by allowing the fluid to flow between compartments in one direction only, thus improving load stability. The interior of the receiver body may comprise one or more vertical baffles 24a (or bulkheads) and/or horizontal baffles 24b, as shown in FIGS. 7 to 9.

Bidirectional diffuser doors 28 may be positioned in vertical baffles to control the side to side and front to back movement of the fluid within the receiver when the baffles are positioned longitudinally and transversely, respectively, within the receiver body. Unidirectional check valves positioned in horizontal baffles will restrict the movement of fluid up and down the sides of the receiver. The ability to restrict the movement of fluid within the receiver in this way is particularly important when a vehicle bearing or towing the receiver is traversing an incline or traveling over rough terrain or up and down slopes. The use of vertical and horizontal baffles within the interior of the receiver body can also provide the receiver with added strength.

Internal piping 26 can be used to transfer fluid to and from compartments within the receiver.

Typically, stress endured during off-road or heavy-duty applications requires fluid receivers to be rigid to withstand the stress. A chassis or sub-frame usually provides this stability. However, in the fluid receiver of the present invention, the reinforced twin skin mounting plate in the receiver floor provides the strength to withstand torsion forces and maintain the structural integrity, while the reduced thickness of the fluid receiver body allows the fluid receiver to flex, thereby preventing cracking of the fluid receiver when stress is applied.

In one embodiment, the interior of the receiver body also employs the use of stress disbursement means 27 in the form of strategically positioned substantially flat elements, which may take any suitable shape, such as rectangles, ovals, circles, irregular shapes, etc. The stress disbursement means are used to reduce stress at critical points in the receiver, typically found at joins (such as weld joins) between structural components of the receiver body, to further prevent cracking of the receiver when stress is applied.

As shown in FIGS. 7 to 9, stress disbursement means in the form of substantially flat bars 27a are used to disburse stress at the join between the vertical baffles 24a and side walls 3 of the receiver body in order to improve the structural integrity of the receiver. In effect, each stress disbursement means provides additional strength to the substantially perpendicular join between two planar surfaces of two joined parts without requiring the thickness of the parts to be increased for strength. The stress disbursement means increase the welded surface area at critical joints thus reducing stress points. Stress disbursement means in the shape of "pennies" 27b (i.e. of substantially circular shape or disc-shaped) may be used to reduce the effect of stress at smaller joins, as can be seen in FIG. 8.

Advantages of the Invention

A particular advantage of the fluid receiver of the present invention is its significantly improved stability compared to that of a vehicle (or carrier) carrying known fluid receivers. The added stability is achieved via a number of elements, which can be used alone or in combination within the fluid receiver of the invention. In particular, the structural design of the fluid receiver of the invention (particularly its shape, inner baffles, modular construction method, reinforced floor, and drive shaft tunnel, either alone or in combination) provides it with sufficient strength that it has the advantage of being able to be attached to a vehicle without the need of a chassis or sub-frame. Because a chassis or sub-frame is not required, the centre of gravity of a vehicle carrying the receiver of the invention, and the height of the fluid receiver with respect to the ground, can be lower than that of vehicles carrying known fluid receivers. This improves the static rollover threshold of a vehicle bearing the fluid receiver, making it less susceptible to rolling over, particularly when traveling over uneven terrain or when traversing slopes.

Furthermore, the fluid receiver of the invention can be of lighter weight than a vehicle carrying or towing known fluid receivers. This is due to the fluid receiver design which allows reductions in build material thickness whilst maintaining structural integrity, and removes the need for a heavy-duty chassis or sub-frame. Consequently, the weight of the vehicle/ carrier and receiver combination is less, thereby reducing fuel and power used to transport the receiver and its contents, and increasing the payload of the vehicle.

Thus, the fluid receiver of the invention provides a significantly improved apparatus for containing and transporting fluid.

Variations and modifications to the preferred embodiments of the invention described herein will be apparent to those skilled in the art. It is intended that such variations and modifications may be made without departing from the scope of the invention and without diminishing its attendant advantages.

What I claim is:

1. A fluid receiver for attaching to a vehicle, the fluid receiver comprising:
a receiver body comprising side walls extending upwardly from a receiver floor; wherein a wheel arch is formed within the receiver floor and comprises a reinforced mounting plate to which is attached a mounting system for attaching wheels to the fluid receiver, the mounting system comprising at least one axle and axle mount, the reinforced mounting plate comprising a twin skin part of the receiver floor arranged to provide strength to assist in withstanding torsion forces and to assist in maintaining the structural integrity of the fluid receiver.

2. The fluid receiver of claim 1, wherein the receiver floor is shaped to define an inverted U-shaped drive shaft tunnel that extends between the wheel arch and a front end of the fluid receiver.

3. The fluid receiver of claim 2 wherein part of the drive shaft tunnel is substantially surrounded by a brace.

4. The fluid receiver of claim 1, wherein the mounting system further comprises a suspension system.

5. The fluid receiver of claim 4, wherein the mounting system further comprises a second axle, the first and second axles engaging with the suspension system comprising:
a pair of walking beams attached to the receiver floor via a centrally located pivot shaft held within a pivot shaft housing attached to or integral with the mounting base;
wherein at least one shock absorber is positioned at or near distal ends of each walking beam so as to be located between the walking beams and axles; and
at least one locating means attached to the receiver body and the first axle; and
at least one locating means attached to the receiver body and the second axle.

6. The fluid receiver of claim 5, wherein each locating means comprises a bracket having splayed arms that attach to the respective axle.

7. The fluid receiver of claim 5, wherein the at least one shock absorber comprises a rubber block suspension unit.

8. The fluid receiver of claim 1, wherein at least one vertical or horizontal baffle is positioned within the receiver body to define a plurality of compartments within the receiver.

9. The fluid receiver of claim 8, wherein at least one unidirectional valve is positioned in the at least one horizontal baffle.

10. The fluid receiver of claim 8, wherein at least one bidirectional diffuser door is positioned in the at least one vertical baffle.

11. The fluid receiver of claim 1, wherein stress disbursement means are positioned between one or more joins formed between structural components of the receiver body.

12. The fluid receiver of claim 1, wherein the receiver body comprises an upper portion and has an interior, and wherein a frame is located on the receiver body interior and is positioned to substantially surround the periphery of the upper portion of the receiver body; and wherein the side walls of the receiver body are attached to the frame.

13. The fluid receiver of claim 12, further comprising a top section that is attached to the frame and surrounds the periphery of the upper portion of the receiver body.

14. The fluid receiver of claim 11, wherein the frame comprises a base and a pair of arms extending from each side of the base to form a substantially U-shaped section, the base of the frame being positioned to face toward the side walls of the receiver body.

* * * * *